(12) United States Patent
Sellers

(10) Patent No.: US 11,751,514 B1
(45) Date of Patent: Sep. 12, 2023

(54) TRIPOD EASEL FOR WREATH MAKING

(71) Applicant: Regina Sellers, Houma, LA (US)

(72) Inventor: Regina Sellers, Houma, LA (US)

( * ) Notice: Subject to any disclaimer, the term of this patent is extended or adjusted under 35 U.S.C. 154(b) by 0 days.

(21) Appl. No.: 18/052,012

(22) Filed: Nov. 2, 2022

(51) Int. Cl.
*A01G 5/04* (2006.01)
*A01G 5/02* (2006.01)
*A47B 97/08* (2006.01)

(52) U.S. Cl.
CPC ............ *A01G 5/04* (2013.01); *A01G 5/02* (2013.01); *A47B 97/08* (2013.01)

(58) Field of Classification Search
CPC .. A01G 5/04; A01G 5/02; A47B 97/08; A47B 97/04; A47B 97/06; A47B 97/02; A47B 83/008
USPC ...... 248/27, 441.1, 449, 450, 451, 460–464, 248/447, 448, 454, 455; 312/230, 231, 312/281, 233, 237
See application file for complete search history.

(56) References Cited

U.S. PATENT DOCUMENTS

| | | | | | |
|---|---|---|---|---|---|
| 281,591 | A * | 7/1883 | Werner | ............ | A47B 97/08 248/463 |
| 1,065,255 | A * | 6/1913 | Kuhrt | ............ | A47B 97/08 312/231 |
| 1,585,547 | A * | 5/1926 | Jones | ............ | A01G 5/04 248/340 |
| 2,485,517 | A * | 10/1949 | Vaule | ............ | A47B 97/08 434/420 |
| 3,095,665 | A * | 7/1963 | Killen | ............ | A47B 97/08 248/455 |
| 3,148,850 | A * | 9/1964 | Johnson | ............ | A01G 5/04 248/27.8 |
| 3,304,045 | A * | 2/1967 | Bethoney | ............ | A47B 97/08 248/170 |
| 4,123,127 | A * | 10/1978 | Ford | ............ | A47B 97/08 312/231 |
| 4,627,592 | A * | 12/1986 | Stillwell | ............ | A47B 97/08 248/455 |
| 5,950,979 | A * | 9/1999 | Mira | ............ | A47B 97/08 248/460 |
| 6,206,183 | B1 * | 3/2001 | Helsel | ............ | A47B 97/08 248/441.1 |
| 7,293,753 | B1 * | 11/2007 | Kapp | ............ | A47B 97/08 248/464 |
| 9,113,709 | B2 * | 8/2015 | Jewett | ............ | A47B 97/04 |
| 2007/0075209 | A1 * | 4/2007 | Kapp | ............ | F16M 11/34 248/460 |

(Continued)

*Primary Examiner* — Nkeisha Smith
(74) *Attorney, Agent, or Firm* — Dunlap Bennett & Ludwig, PLLC; Anna L. Kinney

(57) ABSTRACT

A tripod easel for manufacturing a wreath includes two front legs; a rear leg; shelves fastened to the front legs with hinges; and horizontal bars fastened to the front legs opposite the shelves. The legs are fastened together at one end. The two front legs have longitudinal adjustment slots. The shelves are fastened to the rear leg when in use and fold against the two front legs for storage. The bars have lateral adjustment slots and equidistant bores. They are adjustable with fasteners in the slots on the legs and in the slots on the bars. The bores hold pegs. The user can comfortably hang a wreath on the lowest bar; assemble the top; hang the wreath on the highest bar; assemble the bottom; and move the wreath to one of the bar ends to assemble the back. The easel can be placed on a floor or tabletop.

13 Claims, 4 Drawing Sheets

(56) References Cited

U.S. PATENT DOCUMENTS

2013/0256495 A1\* 10/2013 Jewett .................... A47B 97/04
 248/460
2015/0108315 A1\* 4/2015 Lee ........................ A47B 97/04
 248/449

\* cited by examiner

TRIPOD EASEL FOR WREATH MAKING

BACKGROUND OF THE INVENTION

The present invention relates to wreath making equipment and, more particularly, to a tripod easel for wreath making.

In making wreaths, it is known to use a wreath frame. When designing a wreath, much of the work is done to the front of the wreath. However, existing wreath frames or workstations provide no access to the back of wreath to finish the job. One tripod-style workstation has a back leg held on with a small chain or solid wood board for tabletop. It is very wobbly, not stable, and falls over easily. The artist cannot adjust the stand to keep the wreath at comfortable work position and cannot move the wreath from right to left. The wreath stand provides no component to hold a hot glue gun or other tools needed to complete the job. As can be seen, there is a need for a stable work stand with means to hold tools to design wreaths.

SUMMARY OF THE INVENTION

In one aspect of the present invention, a tripod easel for manufacturing a wreath comprises two front legs and a rear leg fastened together at one end, wherein the two front legs have longitudinal adjustment slots formed therein; shelves hingedly fastened to a first surface of the two front legs and operative to fastenably bracket the rear leg when the shelves are in a horizontal, in use position, said shelves operative to fold against the two front legs in a vertical, storage position; and horizontal bars having lateral adjustment slots and equidistant bores formed therein, said horizontal bars being adjustably fastened to a second surface of the two front legs opposite the first surface via the longitudinal adjustment slots in conjunction with the lateral adjustment slots, the equidistant bores being operative to accommodate pegs.

In another aspect of the present invention, a method of manufacturing a wreath on the tripod easel comprises opening the tripod easel to an in-use position; hanging a wreath midway along a length of a lowest of the horizontal bars; assembling a top of the wreath; hanging the wreath midway along a length of a highest of the horizontal bars; assembling a bottom of the wreath; moving the wreath to a peg inserted into one of the equidistant bores at a first end; assembling a back of the wreath; moving the wreath to a peg inserted into one of the equidistant bores at a second end; completing manufacture of the wreath; and closing the tripod easel into a storage position.

The inventive wreath stand may be placed on a floor or tabletop. The stand supports a wide variety of wreath positions for hours of comfortable arm movement, no reaching up for long periods of time. Anyone with any kind of shoulder problems may continue to enjoy wreath making. The artist may now move the wreath around the stand, up, or down for comfortable arm positions, allowing for hours of comfortable work. The tools are at the artist's fingertips and off the worktable.

These and other features, aspects and advantages of the present invention will become better understood with reference to the following drawings, description, and claims.

DETAILED DESCRIPTION OF THE INVENTION

Figure 1:
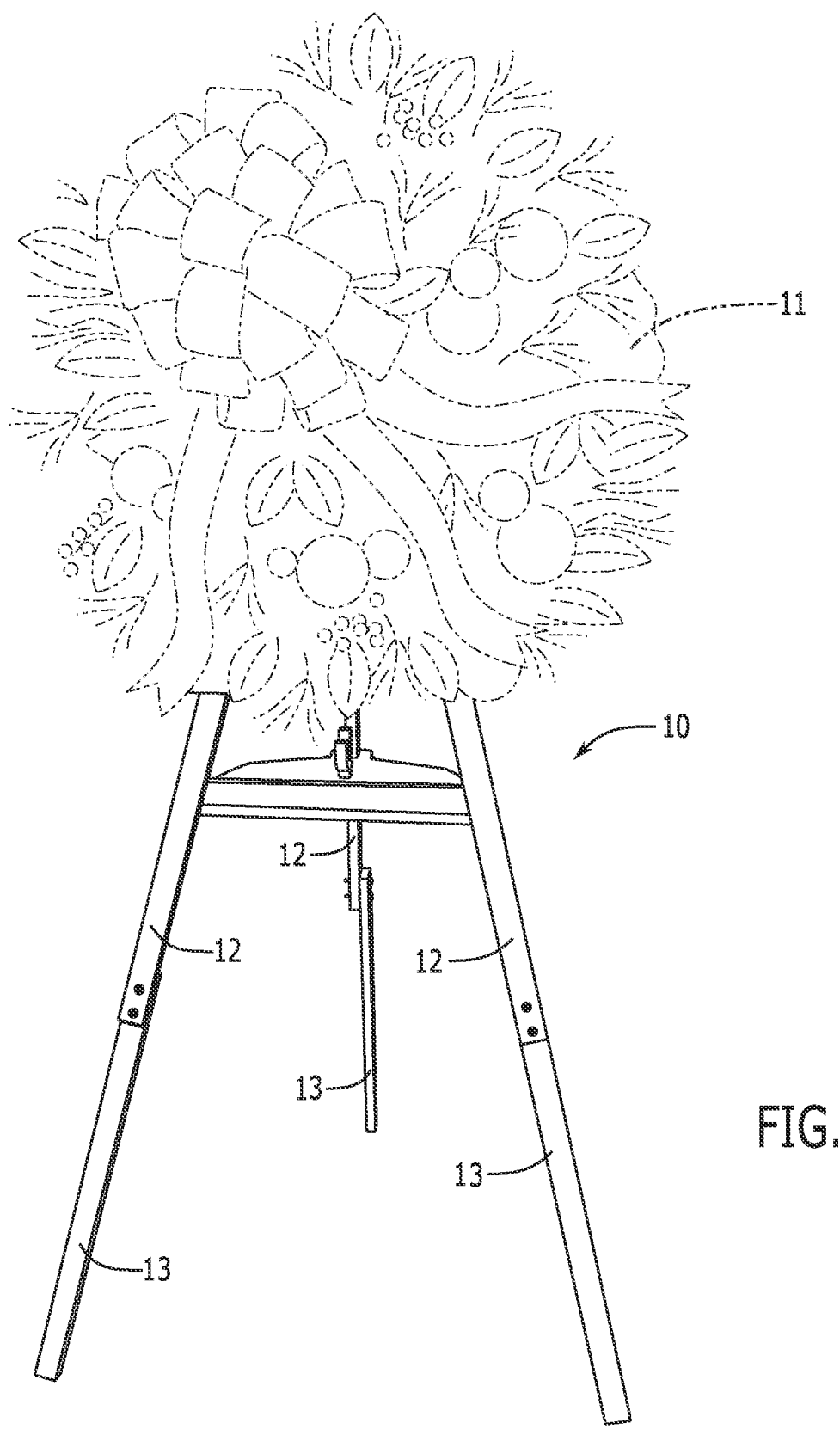
FIG. 1 is a front perspective view of a wreath stand according to an embodiment of the present invention, shown in use.

The following detailed description is of the best currently contemplated modes of carrying out exemplary embodiments of the invention. The description is not to be taken in a limiting sense but is made merely for the purpose of illustrating the general principles of the invention, since the scope of the invention is best defined by the appended claims.

Broadly, one embodiment of the present invention is a tripod stand or easel for preparing wreaths.

Two screws or bolts fastening an extension member to an elongated primary member of the leg at a position about 2/3 the way down the full length of each leg enable the legs to be adjusted to make it a tabletop wreath stand.

The inventive stand has fold down or drop down tables or shelves with a prop operative to hold a hot glue gun and holes operative to hold the artist's wreath making tools. Any suitable number of tables or shelves may be provided, such as 1 to about 4, e.g., 2. This makes the glue gun and tools accessible from any direction, and there is no need to search for tools. They also hold the back leg in place without a chain. This makes the stand extremely sturdy; it does not tip over even when a 25 lb. weight is hung from an outside dowel or peg. Adjacent to the glue gun prop, the drop down table may have one or more protective surfaces including, but not limited to, ceramic tile, metal, glass, silicone, vinyl, and any combination thereof. The shape of the protective surface is not particularly limited and may be, for example, square, circular, or hexagonal.

Three horizontal bars or arms on the front, e.g., highest, middle, and lowest, are adjustable up and down for easy access, regardless of the artist's height. For example, a 6' tall artist may move the bars up to a selected position while a 5' tall artist may move the bars down to another selected position. The number of bars is not particularly limited and may range from about 2 to about 5. Each bar has lateral adjustment slots configured to operate in conjunction with longitudinal adjustment slots on the front two legs so that the fasteners may remain in both slots and the distance therebetween may adapt as the bar is moved up and down.

The artist may move the wreath into different positions for a comfortable arm position while working. When working on the top of a wreath, the artist may hang the wreath from the bottom bar. When working on the bottom of the wreath, the artist may hang the wreath from the top bar.

Holes adjacent to each end and in the center of the 3 horizontal bars accommodate dowels or pegs, enabling the artist to move the wreath to the far right or left for access to the back for a professional finish. The number of holes is not particularly limited. In some case, additional holes may be formed in the horizontal bars. When working on the front of a wreath, the artist may use the center holes with the dowels to hold the wreath in position. The artist may move the wreath to a dowel inserted into the right hole to work on the back of the wreath, step around to the back of the wreath stand, no legs of the tripod are in the way half of the wreath is fully accessible. The artist may now finish up the right back side, then move the wreath to a dowel inserted in the left hole, and the artist may finish the left side. It is fully accessible in each of the positions.

Referring to FIGS. 1 through 4, FIG. 1 illustrates a wreath stand 10 according to an embodiment of the present invention, having adjustable legs 12 fastened together at one end in a tripod configuration. The wreath stand 10 may stably support a wreath 11 on the front or on either side of the stand. Each leg 12 has an extension 13 fastened (e.g., with fasteners such as screws or bolts) thereto, which may be removed, rotated, or fastened higher on the leg 12 so that the stand may be converted to use on a table.

Figure 2:
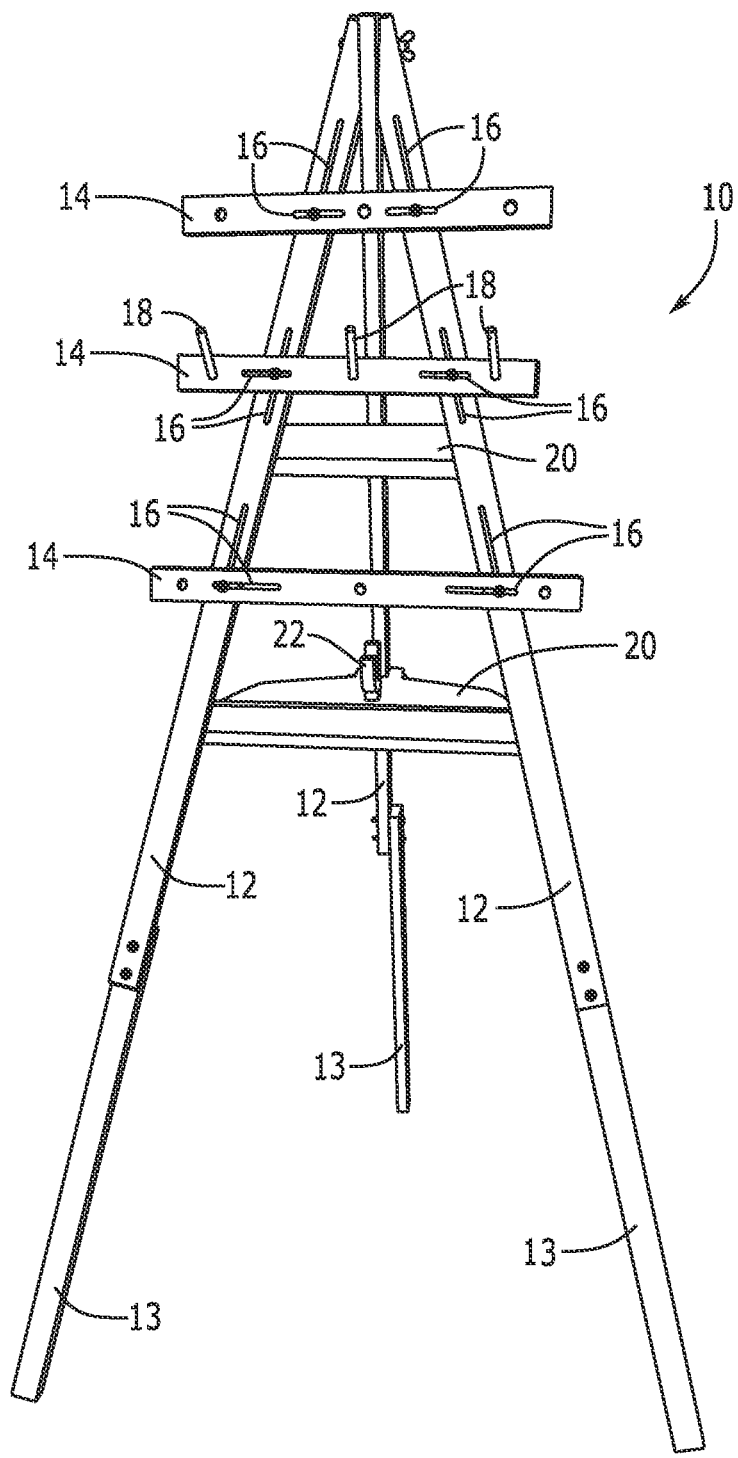
FIG. 2 is another front perspective view thereof.

As shown in FIG. 2, the stand 10 is highly adjustable. Adjustable horizontal arms 14 having lateral adjustment slots 16 fasten (e.g., bolt or screw) into longitudinal adjustment slots 16 on two of the legs 12 and are secured with wing nuts 24 (see FIG. 3) which may be loosened to move the arms 14 to a different height. Bores, holes, or apertures in each of the horizontal arms 14 accommodate wreath-holding pegs 18 equidistant at a left position, a center position, and a right position. Two drop-down shelves or tables 20 are fastened to a reverse surface of the two legs 12 that support the horizontal arms 14. On one of the tables 20, a glue gun holder 22 is centrally affixed. The glue gun holder 22 is more clearly shown in FIG. 3.

Figure 3:
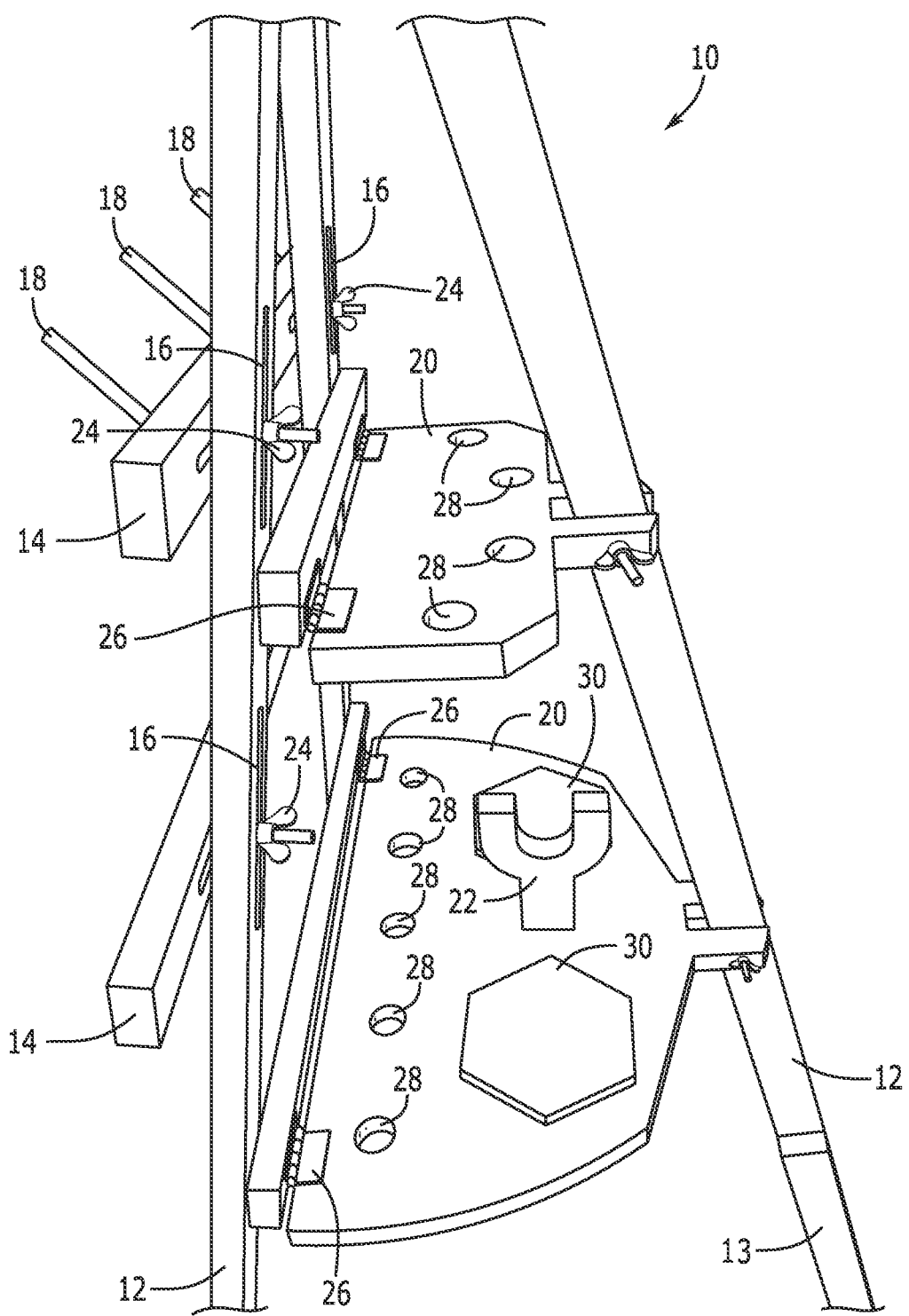
FIG. 3 is a detail side perspective view thereof.
Figure 4:
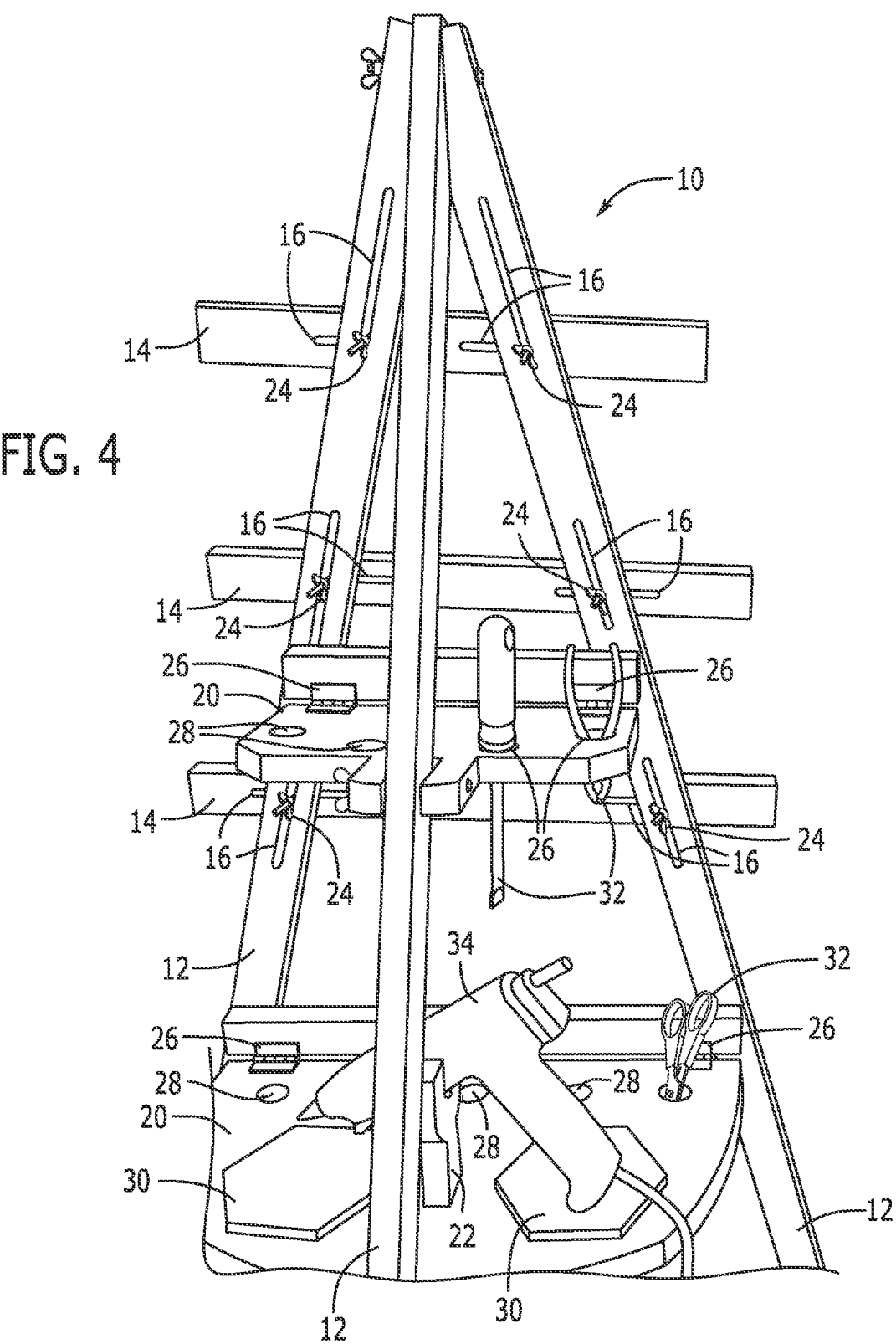
FIG. 4 is a detail rear perspective view thereof.

FIG. 3 shows the tables 20 attached to the two front legs 12 with hinges 26. The tables 20 each extend to form a slot operative to bracket the rear leg 12 when the tables 20 are horizontal in an in-use position and may be affixed to the rear leg 12 for stability, e.g., with fasteners as shown. The tables 20 may be unfastened and are operative to fold up into a substantially vertical position against the two front legs for storage. Both tables 20 have tool apertures 28 to accommodate tools 32, as shown in FIG. 4. The glue gun holder 22 has a rounded "Y" shape, i.e., a trunk topped with an arcuate portion rising to two parallel branches forming a "U" shape. The trunk is joined to the lower table 20 perpendicular to the plane of the table 20. Ceramic tile drip mats 30 positioned on both sides of the glue gun holder 22 prevent damage from the hot glue gun 34 or excess glue.

FIG. 4 illustrates the rear of the stand 10 with tools 32 placed in the apertures 28 and a hot glue gun 34 resting on the glue gun holder 22, with the handle resting on one of the ceramic tile drip mats 30. The tools are easy to find, easily accessible, and not in the way. The wing nuts 24, slots 16, and hinges 26 that lend adaptability to the stand 10 are readily visible, as is the connection of the upper table to the rear leg 12. A fastener holding the three legs 12 together at the apex may be loosened so that the rear leg 12 folds against the tables 20 in a storage position.

It should be understood, of course, that the foregoing relates to exemplary embodiments of the invention and that modifications may be made without departing from the spirit and scope of the invention as set forth in the following claims.

What is claimed is:

1. A tripod easel for wreath making, comprising:
   two front legs and a rear leg fastened together at one end, wherein the two front legs have longitudinal adjustment slots formed therein;
   shelves hingedly fastened to a first surface of the two front legs and operative to fastenably bracket the rear leg when the shelves are in a horizontal, in use position, said shelves operative to fold against the two front legs in a vertical, storage position; and
   horizontal bars having lateral adjustment slots and equidistant bores formed therein, said horizontal bars being adjustably fastened to a second surface of the two front legs opposite the first surface via the longitudinal adjustment slots in conjunction with the lateral adjustment slots, the equidistant bores being operative to accommodate pegs.

2. The tripod easel of claim 1, wherein the two front legs and the rear leg each comprises an elongated primary member with an extension member removably fastened thereto.

3. The tripod easel of claim 1, wherein the shelves have apertures formed therein operative to accommodate tools.

4. The tripod easel of claim 1, wherein the tripod easel comprises from to of the horizontal bars.

5. The tripod easel of claim 1, wherein the tripod easel comprises at least two of the shelves.

6. The tripod easel of claim 1, wherein the equidistant bores are formed at a left position, a center position, and a right position in the horizontal bars.

7. The tripod easel of claim 1, further comprising a glue gun holder having a rounded "Y" shape orthogonally joined to one of the shelves.

8. The tripod easel of claim 7, further comprising, adjacent to the glue gun holder, at least one protective surface selected from the group consisting of: ceramic tile, metal, glass, silicone, vinyl, and any combination thereof.

9. The tripod easel of claim 1, wherein:
   the two front legs and the rear leg each has an elongated primary member with an extension member removably fastened thereto;
   the tripod easel has two of the shelves and three of the horizontal bars;
   the shelves have apertures formed therein operative to accommodate tools;
   the equidistant bores are formed at a left position, a center position, and a right position in the horizontal bars; and
   further comprising pegs within at least one of the equidistant bores, and a glue gun holder having a rounded "Y" shape orthogonally joined to one of the shelves, and protective surfaces adjacent thereto selected from the group consisting of: ceramic tile, metal, glass, silicone, vinyl, and any combination thereof.

10. A method of manufacturing a wreath on the tripod easel of claim 1, comprising:
    opening the tripod easel to an in-use position;
    hanging a wreath midway along a length of a lowest of the horizontal bars;
    assembling a top of the wreath;
    hanging the wreath midway along a length of a highest of the horizontal bars;
    assembling a bottom of the wreath;
    moving the wreath to a peg inserted into one of the equidistant bores at a first end;
    assembling a back of the wreath;
    moving the wreath to a peg inserted into one of the equidistant bores at a second end;
    completing manufacture of the wreath; and
    closing the tripod easel into a storage position.

11. The method of claim 10, wherein:
    opening the tripod easel comprises:
    loosening the two front legs and the rear leg at the one end;
    urging the rear leg outward, spread from the two front legs;
    folding down the shelves; and
    fastening the shelves to the rear leg.

12. The method of claim 11, further comprising:
    loosening fasteners within the longitudinal adjustment slots and the lateral adjustment slots;
    moving the horizontal bars to selected positions; and
    tightening the fasteners.

13. The method of claim 10, wherein:
closing the tripod easel comprises:
unfastening the shelves from the rear leg;
folding up the shelves;
urging the rear leg inward, adjacent to the two front legs; and
tightening the two front legs and the rear leg at the one end.

\* \* \* \* \*